United States Patent [19]

Tanca

[11] Patent Number: 5,425,791
[45] Date of Patent: Jun. 20, 1995

[54] CIRCULAR SLAG TAP FOR A GASIFIER

[75] Inventor: Michael C. Tanca, Tariffville, Conn.

[73] Assignee: Combustion Engineering, Inc., Windsor, Conn.

[21] Appl. No.: 269,734

[22] Filed: Jul. 1, 1994

Related U.S. Application Data

[63] Continuation of Ser. No. 998,704, Dec. 30, 1992, abandoned.

[51] Int. Cl.[6] ............................................. C10J 3/48
[52] U.S. Cl. ..................................... 48/76; 48/67; 48/69; 48/77; 48/DIG. 2
[58] Field of Search ............... 48/62 R, 63, 64, 66–69, 48/73, 76, 77, DIG. 2, 203; 110/165 R, 171; 122/5, 6 A, 7 R, 235.23, 235.26

[56] References Cited

U.S. PATENT DOCUMENTS

| | | | |
|---|---|---|---|
| 2,077,410 | 4/1937 | Harts et al. | 122/6 A |
| 2,883,972 | 4/1959 | Griffith | 122/235.26 |
| 4,323,366 | 4/1982 | Staudinger | 48/DIG. 2 |
| 4,437,864 | 3/1984 | Gorris et al. | 48/67 |
| 4,457,764 | 7/1984 | Dorling et al. | 48/DIG. 2 |
| 4,563,184 | 1/1986 | Sima | 48/69 |
| 4,610,697 | 9/1986 | Darling et al. | 48/67 |
| 4,768,470 | 9/1988 | Ziegler | 122/7 R |
| 4,818,253 | 4/1989 | Kohnen et al. | 48/69 |
| 4,852,997 | 8/1989 | Segerstrom et al. | 48/69 |
| 5,107,798 | 4/1992 | Gerep | 122/7 R |

FOREIGN PATENT DOCUMENTS 2135434  8/1984  United Kingdom ................. 48/203

Primary Examiner—Peter Kratz
Attorney, Agent, or Firm—Arthur E. Fournier, Jr.

[57] ABSTRACT

A slag tap system for a pressurized gasifier system that includes a reaction vessel and a pressure vessel in surrounding relation to the reaction vessel. The slag tap system includes a slag tap portion through which slag is discharged from the reaction vessel, mounting means for mounting the slag tap portion in supported relation within the reaction vessel, water inlet means operatively connected to the slag tap portion for introducing water thereinto, water outlet means operatively connected to the slag tap portion for discharging water therefrom after the passage of the water through the slag tap portion, a slag tank mounted in supported relation within the pressure vessel below and in spaced relation to the slag tap portion and operative to receive the slag for quenching therewithin after the slag has been discharged from the slag tap portion, and discharge means operatively connected to the slag tank for effecting the discharge therefrom of the slag after the slag has undergone quenching within the slag tank.

4 Claims, 5 Drawing Sheets

CIRCULAR SLAG TAP FOR A GASIFIER

The Government of the United States of America has rights in this invention pursuant to Contract No. DE-FC21-90MC26308.

This is a Continuation, of application Ser. No. 07/998,704, filed Dec. 30, 1992, now abandoned

BACKGROUND OF THE INVENTION

This invention relates to coal gasifiers, and more specifically, to a circular slag tap for a pressurized coal gasifier.

Current governmental air pollution standards limiting the level of emissions from the stacks of fossil fuel-fired power generation equipment have created an urgent need for clean burning fuels. An obvious solution to this problem is to burn fuels which are low in particulate matter and sulfur content, and to do so in a manner that will minimize $NO_x$ emissions. However, such fuels are in relatively short supply and also are relatively more expensive.

One solution to the problem, particularly in the United States where the basic proven energy reserves are predominantly coal, is the gasification of coal to produce a fuel gas suitable for firing in a steam generator and similar devices, or for firing in a gas turbine, which is part of an integrated gasification combined cycle system (IGCC). Generally speaking, coal gasification involves the reaction of coal, at high temperatures, with a gas containing oxygen, and steam to produce a gas, containing principally carbon monoxide (CO) and hydrogen ($H_2$), which is suitable for use as a fuel gas.

The processes, which to date have been employed for purposes of achieving coal gasification, can be conveniently divided into three categories:

1. Fixed bed gasification where lump coal is supported on a grate or by other means and the flow of gas and coal may be concurrent or countercurrent;
2. Fluidized bed gasification where crushed or fine coal is fluidized by the gasifying medium, giving an expanded fuel bed that can be visualized as boiling liquid; and
3. Suspension or entrainment gasification where fine coal is suspended in the gasifying medium such that the fine coal particles move with the gasifying medium either linearly or in a vortex pattern.

At one time fixed bed gasifiers were felt by many to be the most attractive from the standpoint of economics. In this regard, the economically desirable features of fixed bed gasifiers were deemed to encompass the following features: their inherent relatively high carbon conversion ratio, the fact that a low producer volume is required per unit of gas production, and the fact that a minimum amount of fuel preparation is required in connection with the use thereof.

By way of exemplification and not limitation, one example of a fixed bed gasifier is that which forms the subject matter of U.S. Pat. No. 3,920,417 entitled "Method of Gasifying Carbonaceous Material", which issued on Nov. 18, 1975 and which is assigned to the same assignee as the present patent application. In accordance with the teachings of U.S. Pat. No. 3,920,417, there is provided a method of producing a clean low BTU fuel gas by the reaction of a carbonaceous fuel with free oxygen and steam in a downdraft fixed bed gasifier. The material to be gasified is introduced at the upper end of the fixed bed gasifier where it is preheated, dried and devolatilized by a stream of hot gas from the lower zones of the fixed bed gasifier, which has been drawn upward and which is withdrawn from the fixed bed gasifier at the upper end thereof. This upward flow of gas also serves to maintain the ignition level of the carbonaceous fuel material at a predetermined level within the oxidation zone of the fixed bed gasifier. The portion of gas withdrawn from the upper end of the fixed bed gasifier, which contains the volatiles released by the carbonaceous material, is reintroduced into the fixed bed gasifier in the oxidation zone where the temperature is sufficiently high to effect thermal cracking of the volatiles to valuable hydrocarbon compounds. Continuing, as the carbonaceous fuel material moves downward through the shaft of the fixed bed gasifier it passes successively through oxidation and reduction zones where air or some other free oxygen containing gas, and steam, respectively, are introduced into the fixed bed gasifier. The resulting reactions convert the carbonaceous fuel material and other reactants to an incandescent char matrix extending to the shaft of the fixed bed gasifier, gaseous products (the makeup thereof depending upon the level of the fixed bed gasifier), and a molten slag.

A subsequent modification in the design of fixed bed gasifiers wherein a second stage has been added in cooperative association with the fixed bed gasifier forms the subject matter of U.S. Pat. No. 4,069,024 entitled "Two-Stage Gasification System", which issued on Jan. 17, 1978 and which is assigned to the same assignee as the present application. In accordance with the teachings of U.S. Pat. No. 4,069,024, there is provided a method and apparatus for directing a low BTU content synthesis gas, as produced in a fixed bed gasifier, for example, of the type previously disclosed in U.S. Pat. No. 3,920,417, through a second stage having a serially interconnected pyrolyzer of so-called "spouting bed" design wherein the hot synthesis gas from the fixed bed gasifier is contacted by a hot carbonaceous charge and lime to utilize its high sensible heat to produce a cool, higher BTU product. Reactions take place between some of the carbon of the charge and hydrogen of the gas to increase the hydrocarbon content of the gas before it is conducted to its place of use, while the lime reacts with the sulphur to reduce if not eliminate the sulphur content of the gas. The remaining charge of char is devolatilized and passed on to the fixed bed gasifier where a hot oxidizer and steam are added thereto to produce more synthesis gas that is supplied back to the second stage, i.e., to the pyrolyzer, for reaction with the carbonaceous charge and lime.

Turning next to a consideration of entrainment, i.e., suspension, gasification, there are examples thereof to be found in the prior art. By way of exemplification and not limitation, one such example of an entrainment gasification process is that which forms the subject matter of U.S. Pat. No. 4,158,552 entitled "Entrained Flow Coal Gasifier", which issued on Jun. 19, 1979 and which is assigned to the same assignee as the present patent application. In accordance with the teachings of U.S. Pat. No. 4,158,552, a high temperature level of product gas stream is formed by burning primarily char with the existing air supply. Immediately thereafter additional char is introduced into the high temperature stream for gasification of these carbon particles. Then, following the endothermic gasification reaction which cools the gases, new fresh coal is introduced with this coal being devolatilized at relatively low temperature, thus utilizing low temperature heat. Entrained char particles are thereafter removed from the gas stream and reintroduced into the gasifier. The low temperature devolatilization of the fresh coal is achieved by gas temperatures at a level which is insufficient to effectively continue the carbon gasification process. Accordingly, more of the available heat is used for the basic purpose of the coal gasification operation, which is of course to produce gas having the maximum reasonable heating value.

Another example of an entrainment gasification process is that which forms the subject matter of U.S. Pat. No. 4,343,627 entitled "Method of Operating a Two-Stage Coal Gasifier", which issued on Aug. 10, 1982 and which is assigned to the same assignee as the present patent application. In accordance with the teachings of U.S. Pat. No. 4,343,627, an object of the invention disclosed therein is to increase the effectiveness of an entrained flow gasifier by enhancing its ability to produce a product gas having an increased heating value. Moreover, the manner in which this is accomplished is that steam is used as the conveying medium for carrying the additional coal to be injected into the reduction zone from the coal source to the reduction zone. Upon entering the reduction zone, the steam reacts with the additional coal to form carbon monoxide and hydrogen. Therefore, rather than lowering the heating value of the product gas as is the case when either air or inert gas are used as the conveying medium, the steam reacts to form additional carbon monoxide and hydrogen thereby increasing the heating value of the product gas formed in the reduction zone. Further, by using steam as the conveying medium, the possibility of an explosion in the transport line between the coal source and the reduction zone is eliminated.

Yet another example of an entrained gasification process is that which forms the subject matter of U.S. Pat. No. 4,610,697 entitled "Coal Gasification System with Product Gas Recycle to Pressure Containment Chamber", which issued on Sep. 9, 1986 and which is assigned to the same assignee as the present patent application. In accordance with the teachings of U.S. Pat. No. 4,610,697, there is provided a pressurized coal gasifier for producing a clean, particulate free fuel gas suitable for use in a gas turbine-generator or a feedstock for a methanation or other chemical process. The subject gasification system includes a pressure containment chamber surrounding an inner, water-cooled chamber wherein a gasification reaction takes place, a second pressure containment chamber surrounding a process gas heat exchanger for cooling the gas produced by the gasification reaction, and a conduit between the first and second vessels having an outer pressure containing wall and an inner water-cooled transfer duct for conducting the produced gas from the gasifier vessel to the heat exchanger. Continuing, the gasifier vessel includes a slag tap disposed at the bottom for removal of any molten slag produced by the gasification reaction. Differential thermal expansion between the pressure containment chamber and the water-cooled gasifier chamber is accommodated without loss of inter-chamber sealing by a water seal between the chambers without the occurrence of gas leakage into the annular volume.

Still another example of an entrained gasification process is that which forms the subject matter of U.S. Pat. No. 4,680,035 entitled "Two Stage Slagging Gasifier", which issued on Jul. 14, 1987 and which is assigned to the same assignee as the present patent application. In accordance with the teachings of U.S. Pat. No. 4,680,035, a two stage coal gasifier is provided that has a vertically elongated gasifier chamber for upward flow of the gas to an opening at the top. Tubes comprising the walls of the chamber form a centrally located slag tap opening at the bottom of the chamber. In the lower portion of the gasifier is a combustion section where fuel injection nozzles inject coal tangentially along with combustion supporting air to supply the heat source. At an upper elevation is a reductor section wherein additional fuel is introduced for the purpose of gasifying this additional fuel. Between the combustor section and the reductor section there is a centrally located baffle. This baffle is larger in plan area than the tap opening and is arranged so that any slag falling around the baffle will land some distance remote from the slag tap opening. The centrally located baffle minimizes the radiation loss from the combustor to the reductor, blocks the central portion of the gasifier chamber so that gas is not drawn back down from the reductor section, and forces the slag falling from the reductor to enter the combustor at a location outboard of the slag tap opening so that it has time to be heated substantially before passing to the slag tap opening.

Although gasifier systems constructed in accordance with the teachings of the various U.S. patents to which reference has been had hereinbefore have been demonstrated to be operative for the purpose for which they have been designed, there has nevertheless been evidenced in the prior art a need for such gasifier systems to be further improved if increased usage thereof is to be realized. More specifically, there has been evidenced in the prior art a need for a new and improved slag tap system for a gasifier. To this end, there is widely held the belief that a cost effective, efficient means of generating electricity in the 1990's resides in the utilization of a coal gasifier in a combined cycle plant. Furthermore, an integral part of such a gasification process is that the gasifier converts all ash into the form of a fused ash, which is commonly referred to as slag. This slag is an environmentally acceptable waste product, which is drained from the bottom of the gasifier vessel. The temperature within the lower portion of the gasifier vessel is normally on the order of 3000° F. Thus, in order to properly remove the slag from the gasifier vessel, i.e., to tap the slag, a properly designed tapping hole is necessary. In addition, special precautions are required to be taken in order to provide proper slag tapping over a wide range of operating conditions and coal ash compositions.

Moreover, there has been evidenced in the prior art a need for such a new and improved slag tap system for a gasifier that would be particularly characterized in a number of respects. In this regard, one such characteristic which such a new and improved slag tap system would desirably possess is that it be of self-supporting construction. Another characteristic which such a new and improved slag tap system would desirably possess is that it would allow for the slag tap diameter to be designed for slag flow considerations such as slag viscosity and velocity. A third such characteristic which a new and improved slag tap system would desirably possess is that it take the form of sections, such that the sections can be unfastened one from another and be pushed along the floor of the gasifier vessel in order to thereby provide access to the interior of the gasifier vessel using the neck of the slag tap as a manway. A fourth such characteristic which such a new and improved slag tap system would desirably possess is that studded tubing would be employed over the slag touched surfaces so as to thereby allow the slag to solidify to form a heat transfer barrier as well as a corrosion and erosion resistant surface to protect the parent steel of the slag tap. A fifth such characteristic which such a new and improved slag tap system would desirably possess is that it would embody a stainless steel drip edge thereby allowing for good slag separation. A sixth such characteristic which such a new and improved slag tap system would desirably possess is that the water inlet and outlet piping thereof would be withdrawn from the tap hole, i.e., away from the drip edge area, thereby eliminating any excess tube surface near the drip edge on which slag could collect. A seventh such characteristic which such a new and improved slag tap system would desirably possess is that the slag tap sections be capable of being shop fabricated and of being later installed in the field with a minimum amount of field installation.

It is, therefore, an object of the present invention to provide a new and improved slag tap system for a gasifier.

It is another object of the present invention to provide such a new and improved slag tap system for a gasifier wherein the slag tap system is of self-supporting construction.

It is still another object of the present invention to provide such a new and improved slag tap system for a gasifier wherein the slag tap system permits the slag tap diameter to be designed for slag flow considerations such as slag viscosity and velocity.

Another object of the present invention is to provide such a new and improved slag tap system for a gasifier wherein the slag tap system is in the form of sections, such that the sections can be unfastened one from another and be pushed along the floor of the gasifier vessel in order to thereby provide access to the interior of the gasifier vessel using the neck of the slag tap as a manway.

A still another object of the present invention is to provide such a new and improved slag tap system for a gasifier wherein studded tubing is employed over the slag touched surfaces so as to thereby allow the slag to solidify to form a heat transfer barrier as well as a corrosion and erosion resistant surface to protect the parent steel of the slag tap.

A further object of the present invention is to provide such a new and improved slag tap system for a gasifier wherein the slag tap system embodies a stainless steel drip edge thereby allowing for good slag separation.

Yet an object of the present invention is to provide such a new and improved slag tap system for a gasifier wherein the water inlet and outlet piping thereof is withdrawn from the tap hole, i.e., away from the drip edge area, thereby eliminating any excess tube surface near the drip edge on which slag can collect.

Yet a further object of the present invention is to provide such a new and improved slag tap system for a gasifier wherein the slag tap sections of the slag tap system are capable of being shop fabricated and of being later installed in the field with a minimum amount of field installation.

Yet another object of the present invention is to provide such a new and improved slag tap system for a gasifier which is advantageously characterized in that it is suitable for employment in newly constructed gasifiers as well as being equally suitable for utilization in gasifier retrofit applications.

Yet still another object of the present invention is to provide such a new and improved slag tap system for a gasifier which is advantageously characterized in that it is relatively inexpensive to provide, yet despite being relatively simple in construction is reliable in operation.

SUMMARY OF THE PRESENT INVENTION

In accordance with the present invention there is provided a new and improved slag tap system for a gasifier that is operative for the purpose of enabling the slag, which is produced during operation of the gasifier, to be drained from the bottom of the gasifier. The subject slag tap system is suitably located within the gasifier so as to thereby allow the slag to be maintained in a high heat flux zone until the slag separates from the drip edge. As such, the slag tap system operates to keep the slag fluid and does not permit the slag to impinge on the waterwalls of the gasifier thereby preventing the slag from solidifying as well as preventing subsequent other tapping problems.

In accordance with one embodiment thereof, the slag tap system includes a first semicircular tube section wherein the tubes are arranged in a serpentine-like fashion and a second semicircular tube section wherein the tubes are also arranged in a serpentine-like fashion. Both the first and the second semicircular tube sections are supported on the floor of the gasifier. With further reference thereto, the slag tap system in accordance with this one embodiment thereof embodies in addition support channel means that are designed to mate the first semicircular tube section and the second semicircular tube section together such that a tap hole is created at the center thereof. Moreover, in accordance with this one embodiment thereof, the slag tap system also includes fastening means for bolting the first semicircular tube section and the second semicircular tube section together so as to prevent any movement therebetween. Furthermore, in accordance with this one embodiment thereof, water enters each of the first and second semicircular tube sections on the outer periphery thereof and exits from each of the first and second semicircular tube sections somewhere near the middle thereof thereby allowing the drip edge area of the slag tap system to be free from unnecessary water-cooled surface which can cause local slag freezing and subsequent slag tap pluggage.

In accordance with another embodiment thereof, the slag tap system includes a single circular tube section having a tap hole formed at the center thereof. Moreover, in accordance with this embodiment of slag tap system, the tubes of the single circular tube section are arranged in a serpentine-like fashion as well as in a step-like fashion such that as viewed from the tap hole outwardly the tubes are inclined upwardly at an angle of approximately 15°. Further, in accordance with this embodiment of slag tap system water both enters and exits from the single circular tube section on the outer periphery thereof so as to allow in this case also the drip edge area of the slag tap system to be free from unnecessary water-cooled surface which can cause local slag freezing and slag tap pluggage.

DESCRIPTION OF THE PREFERRED EMBODIMENT

Figure 1:
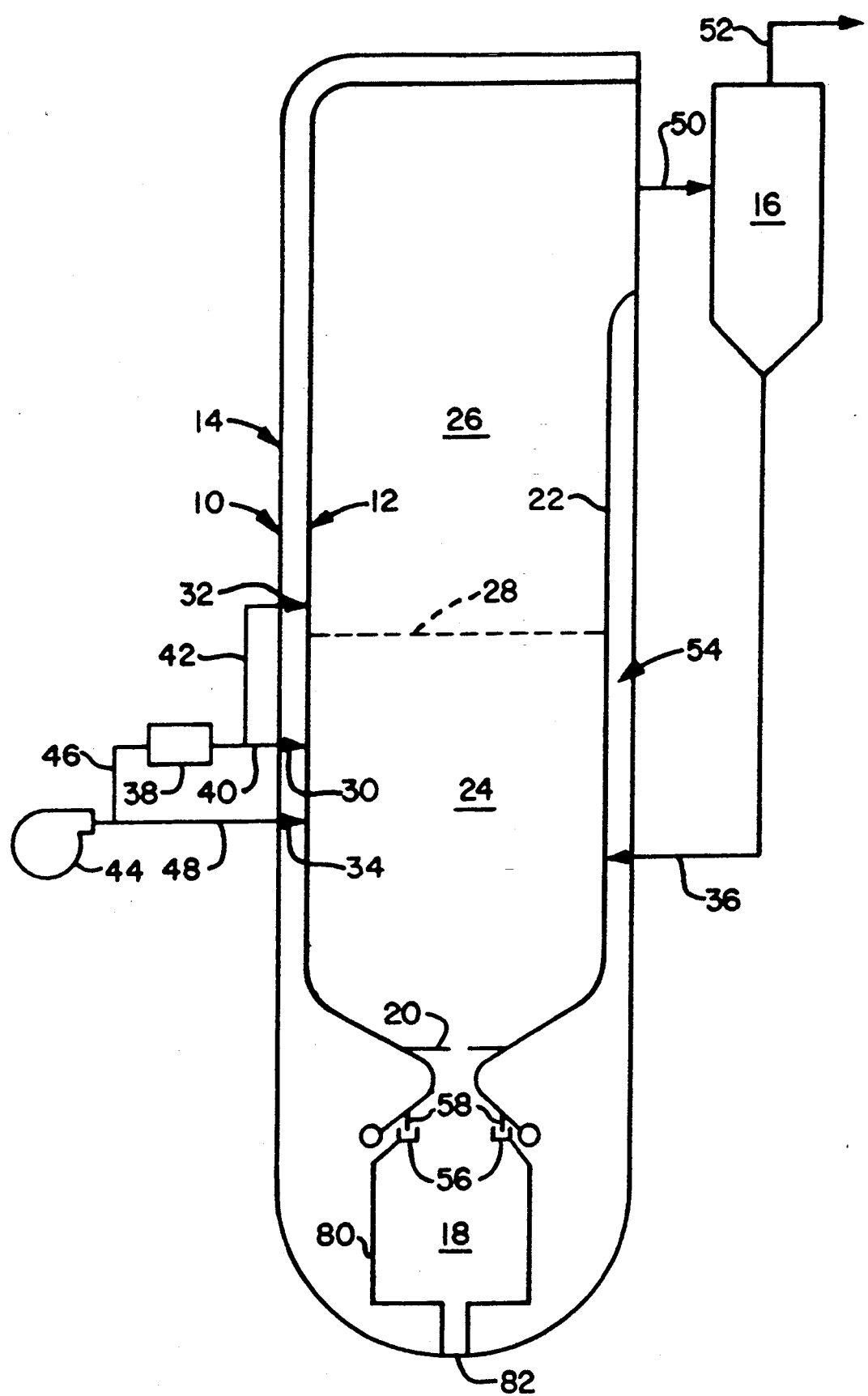
FIG. 1 is a diagrammatic representation of a gasifier system embodying a slag tap system constructed in accordance with the present invention.

Referring now to the drawing, and more particularly to FIG. 1 thereof, there is depicted therein a pressurized gasifier system, generally designated by the reference numeral 10, constructed in accordance with the present invention. As best understood with reference to FIG. 1, the pressurized gasifier system 10 includes a first, i.e., reaction, vessel, generally designated by the reference numeral 12; a second, i.e., pressure, vessel, generally designated by the reference numeral 14; a separator system, generally designated by the reference numeral 16; a water seal means, generally designated by the reference numeral 18; and a slag tap system, generally designated by the reference numeral 20.

In accordance with the preferred embodiment of the invention, the reaction vessel 12 embodies a construction wherein the walls thereof, denoted by the reference numeral 22 in FIG. 1, consist of a multiplicity of tubes, through which water is designed to flow, that are interconnected one to another such as by fusion welding whereby the reaction vessel 12 constitutes a gas-tight, fusion welded, water-cooled tube wall enclosure, which is similar in construction to that of electric utility boilers. In a fashion similar to that of electric utility boilers, steam is generated within the walls 22 of the reaction vessel 12 through the conversion to steam of the water flowing through the tubes that comprise the walls 22 of the reaction vessel 12. This steam is then available for use within the reaction vessel 12 itself and/or for use externally of the reaction vessel 12 such as, for example, to generate power in a power generation application. However, since the primary function that is to be served by the heat, which is generated within the reaction vessel 12, is to effectuate therewithin the gasification of coal, the reaction vessel 12 is designed so that a slag layer will be retained on the inner surface of the walls 22 of the reaction vessel 12. This slag layer is intended to be operative to limit the heat absorption in the waterwalls 22 of the reaction vessel 12 to a small percentage of the total heat that is generated within the reaction vessel 12.

With further reference to FIG. 1, the reaction vessel 12 as illustrated therein is divided into two interconnected zones, i.e., stages, which are designated from bottom to top in FIG. 1 by the reference numerals 24 and 26. These stages 24 and 26 will for ease of reference be henceforth referred to herein as the first stage 24 and the second stage 26. Finally, it should be clearly understood that the reaction vessel 12 in terms of its actual physical configuration is continuous in length, and that although from the standpoint of what occurs within the reaction vessel 12, the reaction vessel 12 may be considered to embody two stages, i.e., the first stage 24 and the second stage 26, the demarcation between these stages has been depicted, simply for ease of reference, through the use of the imaginary, dotted line that is denoted by the reference numeral 28 such that the dotted line 28 as employed in FIG. 1 is simply intended to illustrate the approximate location within the reaction vessel 12 whereat the first stage 24 ends and the second stage 26 begins.

In accordance with the coal gasification process that is practiced with a multistage gasification system, such as the pressurized gasification system 10 that is depicted in FIG. 1 of the drawing, coal, as shown at 30 and 32, respectively, in FIG. 1, is injected into two areas of the reaction vessel 12. One of these areas, for example, that denoted in FIG. 1 as the first stage 24 of the reaction vessel 12, is intended to be a hot region at the bottom of the reaction vessel 12 where the gas temperature is higher than the ash melting temperature. Some of the coal particles, shown at 30 in FIG. 1, and most of the air, shown at 34 in FIG. 1, is injected into the bottom region, i.e., into the first stage 24, of the reaction vessel 12 to supply the heat that is required in order to raise the gas temperature therewithin. Recycled char, which contains some carbon and ash, may also be injected, as shown at 36 in FIG. 1, into this bottom region, i.e., first stage 24, where the char carbon is gasified, and the ash from the coal particles 30 and 32 and that from the recycled char 36 is melted and is slagged out of the reaction vessel 12 through the operation of the slag tap system 20 in a manner to which further reference will be had hereinafter.

In the other area, i.e., in the second stage 26, of the reaction vessel 12 the rest of the coal particles, i.e., the coal particles shown at 32 in FIG. 1, and as little air as possible is injected therewithin into the hot gases which have been generated in the bottom region, i.e., the first stage 24, of the reaction vessel 12. These hot gases as they flow through the second stage 26 of the reaction vessel 12 devolatilize the coal particles 32 that have been injected into the second stage 26 of the reaction vessel 12 and then react with, i.e., effect the gasification of, these devolatilized coal particles 32 to form CO, $CO_2$, $H_2$ and $H_2O$. These gasification reactions to which reference is had here require both heat and residence time.

A description will next be had herein of the manner in which the coal particles 30 and 32 are supplied to the reaction vessel 12 of the pressurized gasifier system 10 as well as of the manner in which the air 34 is supplied to the reaction vessel 12 of the pressurized gasifier system 10. For purposes of this description, reference will be had in particular to FIG. 1 of the drawing. As depicted therein, there is provided a pulverizer, denoted by the reference numeral 38. In a manner well-known to those skilled in the art of pulverization, the pulverizer 38 is designed to be operative to effectuate the reduction of the coal that is supplied thereto for pulverization to coal particles of the size that it is desired to inject into the reaction vessel 12 of the pressurized gasifier system 10. Continuing, the pulverizer 38 is interconnected with the first stage 24 of tile reaction vessel 12 by means of the fuel duct, denoted by the reference numeral 40 in FIG. 1, and is interconnected with the second stage 26 of the reaction vessel 12 by means of the fuel duct, denoted by the reference numeral 42 in FIG. 1. Any conventional form of injection means, not shown in the interest of maintaining clarity of illustration in the drawing, suitable for use for such a purpose may be utilized for purposes of effecting the injection of the coal particles 30 from the fuel duct 40 into the first stage 24 of the reaction vessel 12, and for purposes of effecting the injection of the coal particles 32 from the fuel duct 42 into the second stage 26 of the reaction vessel 12.

With further reference to FIG. 1 of the drawing, there is also provided as depicted therein a fan, denoted by the reference numeral 44. Air is supplied from the fan 44 to the pulverizer 40 by means of an air duct, as shown at 46 in FIG. 1. To this end, the air that is supplied from the fan 44 to the pulverizer 38 through the air duct 46 is employed for purposes of effecting the transport in an air stream, in a manner which is well-known to those skilled in the art of pulverization, of the coal particles 30 and of the coal particles 32. In addition, as can be seen with reference to FIG. 1 of the drawing, the air 34, which is injected into the first stage 24 of the reaction vessel 12 is supplied thereto from the fan 44 through an air duct, which is denoted in FIG. 1 by the reference numeral 48. This air 34 that is supplied to the first stage 24 of the reaction vessel 12 through the air duct 48 is the air that is required to support combustion of the coal particles 30 that are injected into the first stage 24 of the reaction vessel 12. Any conventional form of injection means, not shown in the interest of maintaining clarity of illustration in the drawing, suitable for use for such a purpose may be utilized for purposes of effecting the injection of the air 34 from the air duct 48 into the first stage 24 of the reaction vessel 12.

Referring again to the reaction vessel 12 of the pressurized gasifier system 10, as has been described hereinbefore coal particles 30 are injected into the first stage 24 of the reaction vessel 12. Approximately two-thirds of the coal particles, which are injected into the reaction vessel 12, enter through the first stage 24 as coal particles 30. In turn, again as has been described hereinbefore the air 34, which is required to effectuate the combustion of the coal particles 30 within the first stage 24 of the reaction vessel 12, is injected into the first stage 24 after being supplied thereto from the fan 44 through the air duct 48. The combustion of the coal particles 30 within the first stage 24 of the reaction vessel 12 is designed to produce a temperature therewithin, which is normally on the order of approximately 3000° F. Such a temperature has been found to be sufficient for purposes of enabling the gasification reactions to take place that are desired. In addition, such a temperature is sufficient for purposes of enabling slagging to occur.

The hot gases, which are generated within the first stage 24 of the reaction vessel 12 from the combustion therewithin of the coal particles 30 and air 34, rise within the reaction vessel 12, and in doing so leave the first stage 24 and enter the second stage 26 of the reaction vessel 12. As has been described hereinbefore, the coal particles 32, i.e., the remaining one-third of the coal particles which are fed to the reaction vessel 12, are injected into the second stage 26 thereof. The coal particles 32, in a fashion similar to that described hereinbefore in the case of the coal particles 30, are transported through the fuel duct 42 to the second stage 26 of the reaction vessel 12. Gasification of the coal particles 32 takes place within the second stage 26 of the reaction vessel 12. The temperatures that exist within the second stage 26 of the reaction vessel 12 and at which this gasification takes place are above 1700° F. The gasification reactions that occur within the reaction vessel 12 are endothermic and continue until the temperature within the reaction vessel 12 drops to a point where the reaction rate becomes too low, i.e., wherein the temperature becomes too low within the reaction vessel 12 to effectively support the desired gasification reactions therewithin. It should be noted, however, that the higher the temperatures are that are generated within the reaction vessel 12 the faster will the desired gasification reactions take place therewithin. When the temperature thereof drops to below 1700° F., it is at this point that the gases in the form of a product gas stream along with char, which consists of a mixture of unburned carbon and ash and which has become entrained in the product gas stream, leaves the reaction vessel 12 as has been depicted schematically through the use of the reference numeral 50 in FIG. 1 of the drawing.

From the reaction vessel 12, the product gas stream with the char still entrained therewithin flows, as depicted schematically at 50 in FIG. 1, to the separator means 16. The separator means 16 may take the form of a cyclone, or any other similar conventional device, that is operative to effectuate therewithin the separation of the char, which is entrained within the product gas stream, from the product gas stream itself. Following the separation of the char therefrom the product gas stream, as depicted at 52 in FIG. 1 of the drawing, exits from the separator means 16. Likewise the char 36, following the separation thereof from the product gas stream in the separator means 16, also exits from the separator means 16 and as has been briefly mentioned hereinbefore is recycled back to the reaction vessel 12 and, more specifically, to the first stage 24 of the reaction vessel 12. To this end, the carbon portion of this char 36, which is recycled to the first stage 24 of the reaction vessel 12, is gasified therein, while the ash portion thereof is melted and is slagged out of the reaction vessel 12 in accordance with the operation of the slag tap system 20, which has yet to be described herein in detail.

Continuing with the description of the pressurized gasifier system 10 as depicted schematically in FIG. 1 of the drawing, the reaction vessel 12, as best understood with reference to FIG. 1, is suitably surrounded by the pressure vessel 14 such that there exists therebetween an annulus, generally denoted by the reference numeral 54. The annulus 54 is designed to be filled with a suitable pressurized medium such as steam, recycled product gas, etc. The medium, which fills the annulus 54, is suitably pressurized such that the pressure thereof is greater than the pressure within the reaction vessel 12. As such, since the medium within the annulus 54 is at a greater pressure than the pressure within the reaction vessel 12, in the event that a leak should occur in the reaction vessel 12 the pressurized medium will thus flow from the annulus 54 into the reaction vessel 12. The pressure vessel 14, as will be best understood with reference to FIG. I of the drawing, is suitably provided with a plurality of openings such as to permit, in a manner yet to be described herein, the molten slag to be discharged from the slag tank after it has been transformed through quenching to an inert, glassy, granular material; to permit the coal particles 30 and 32 to be injected into the first stage 24 and the second stage 26, respectively, of the reaction vessel 12; to permit the air 34 to be injected into the first stage 24 of the reaction vessel 12; to permit the recycled char 36 to be injected into the first stage 24 of the reaction vessel 12; and to permit the product gas stream in which the char is entrained to leave, as shown at 50, the reaction vessel 12 and more specifically, the second stage 26 thereof.

Considering next the water seal means 18 of the pressurized gasifier system 10, as will be best understood with reference to FIG. 1 of the drawing, the water seal means 18 is designed to be operative to accommodate any differential thermal expansion that may occur between the pressure vessel 14 and the reaction vessel 12 without loss of inter-vessel sealing therebetween. One form of water seal suitable for use as the water seal means 18 in the pressurized gasifier system 10 as depicted in FIG. 1 of the drawing is the water seal which is described and illustrated in U.S. Pat. No. 4,610,697 to which patent reference has briefly been had hereinbefore.

To this end, the water seal means 18 includes an annular channel depicted at 56 in FIG. 1. The annular channel 56 is designed to be filled with water or other similar liquid. Extending vertically downward into the annular channel 56 from the reaction vessel 12 is a dam, depicted at 58 in FIG. 1, which is sealingly engaged with the lower portion of the reaction vessel 12 and which extends beneath the surface of the liquid in the annular channel 56. The reaction vessel 12 is therefore free to be thermally displaced without the occurrence of any gas leakage between the interior of the reaction vessel 12 and the annulus 54, at least for so long as the vertical dam 58 remains beneath the surface of the liquid in the annular channel 56.

One additional feature of the water seal means 18 is that the water seal means 18 may also function as a safety valve to prevent the occurrence of an unusually large or unacceptable pressure differential between the interior of the reaction vessel 12 and the annulus 54. Should an unusually large pressure differential occur across the water seal means 18, the water seal formed thereby will simply "blow out" allowing gas from the higher pressure region to pass through the annular channel 56 and around the vertical dam 58 until the respective pressures become more nearly equivalent and removing the danger of damage to the relatively flimsy reaction vessel 12. This safety feature is designed to be operative to relieve excessive pressure either internal or external of the reaction vessel 12. The water seal means 18 thus permits the reaction vessel 12 to be designed with less pressure resistance than would otherwise be required in these circumstances.

Figure 2:
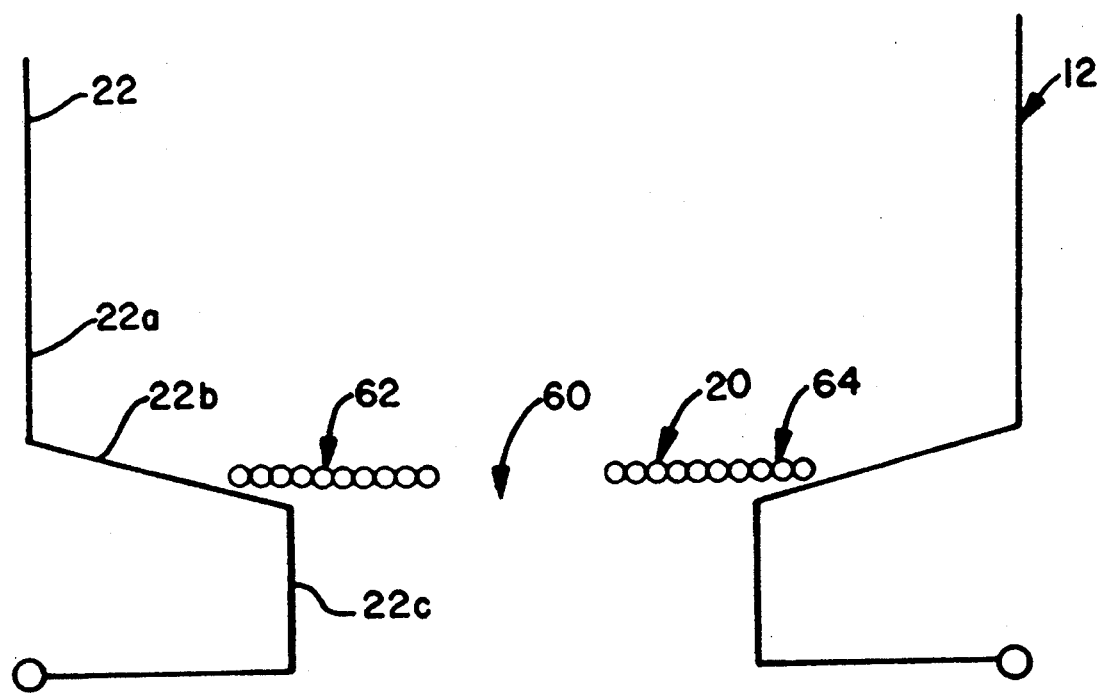
FIG. 2 is a side elevational view on an enlarged scale of the slag tap system portion of the reaction vessel of the gasifier system illustrated in FIG. 1 depicting one embodiment of slag tap system constructed in accordance with the present invention.

There will next be set forth herein a description of one embodiment of a slag tap system 20 with which in accordance with the present invention the pressurized gasifier system 10 that is depicted in FIG. 1 of the drawing may be suitably provided. For this purpose, reference will be had in particular to FIGS. 1, 2, and 3 of the drawing. Considering first the matter of the positioning of the slag tap system 20 relative to the reaction vessel 12, this is best depicted in FIGS. 1 and 2 of the drawing. With further reference to FIG. 2, the reaction vessel 12, as has been described herein previously, is fabricated from waterwalls 22 such that there is thereby formed therefrom the walls, denoted for ease of reference in FIG. 2 by the reference numeral 22a, of the reaction vessel 12, the floor, denoted for ease of reference in FIG. 2 by reference numeral 22b, of the reaction vessel 12, and the slag neck, denoted for ease of reference in FIG. 2 by reference numeral 22c, of the reaction vessel 12.

In accordance with the mode of operation of the reaction vessel 12, the ash that is contained in the coal particles and the recycled char, which are injected into the interior of the reaction vessel 12, liquifies as a consequence of being exposed to the relatively high temperatures that are present in the reaction vessel 12. Thereafter, the liquified ash, commonly referred to as slag, flows down the walls 22a and the floor 22b of the reaction vessel 12 to the tap hole, denoted generally by the reference numeral 60 in FIG. 2 of the drawing, through which in a manner to be more fully described hereinafter the slag is discharged from the reaction vessel 12.

Figure 3:
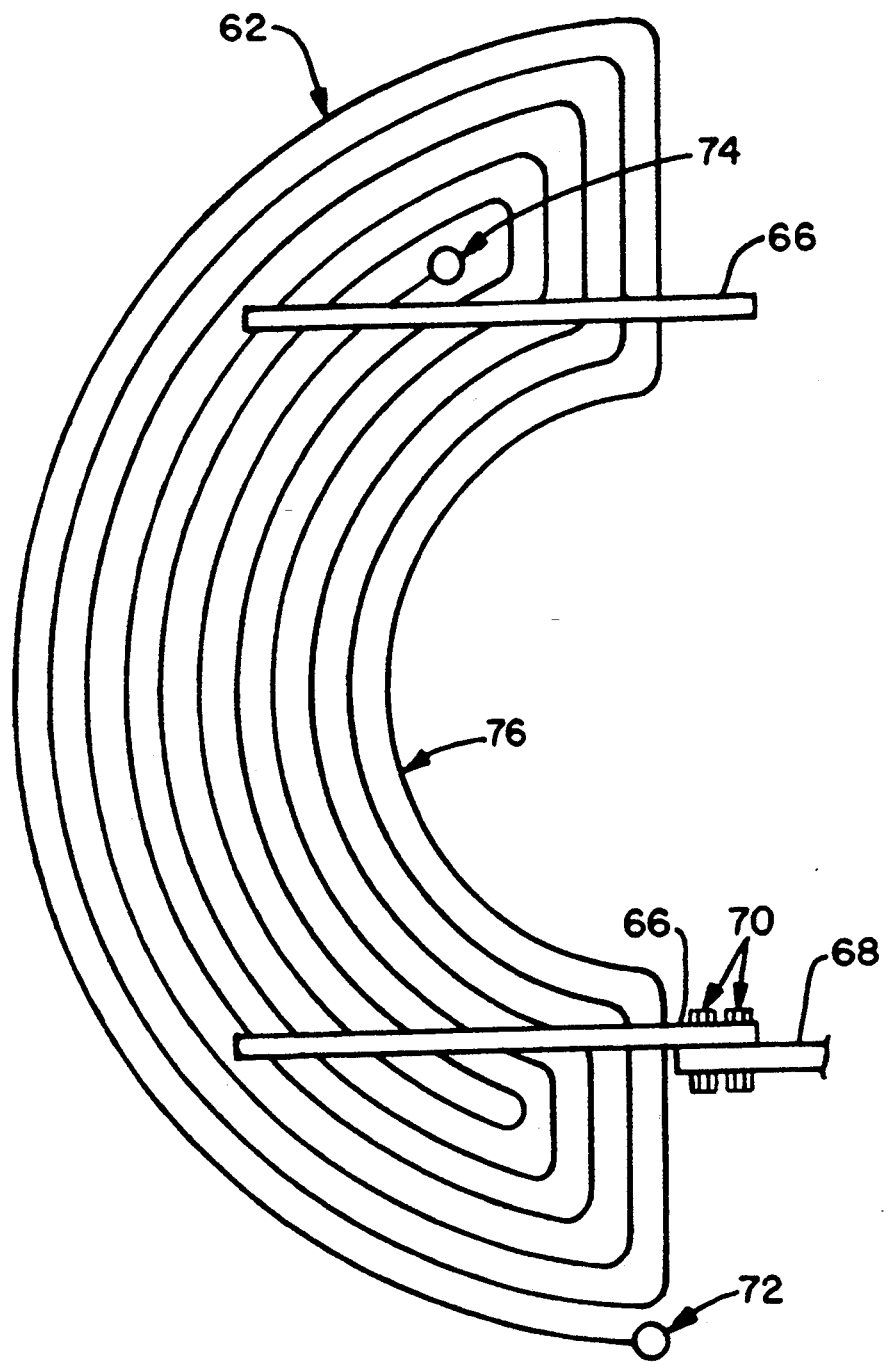
FIG. 3 is a bottom plan view of a portion of the embodiment of slag tap system illustrated in FIG. 2 constructed in accordance with the present invention.

Continuing with a description of the embodiment of the slag tap system 20 that is depicted in particular in FIGS. 2 and 3 of the drawing, the slag tap system 20 includes a first semicircular tube section, denoted generally by the reference numeral 62 in FIG. 2, and a second semicircular tube section, denoted generally by the reference numeral 64 in FIG. 2. Since the nature of the construction of the first semicircular tube section 62 is substantially the same as the nature of the construction of the second semicircular tube section 64, reference will be had for purposes of a detailed description of the nature of the construction of both the first semicircular tube section 62 and the second semicircular tube section 64 to simply the first semicircular tube section 62, as the first semicircular tube section 62 is illustrated in FIG. 3 of the drawing.

With reference, therefore, to FIG. 3 of the drawing, it is to be understood that as depicted therein in the case of the first semicircular tube section 62, both the first semicircular tube section 62 and the second semicircular tube section 64 have the tubes thereof arranged in a serpentine-like fashion. In addition, the first semicircular tube section 62, as best understood with reference to FIG. 3 of the drawing, is suitably provided on the underside thereof with a pair of support channels, each being denoted for ease of reference by the same reference numeral, i.e., reference numeral 66. Any conventional form of mounting means suitable for use for such a purpose may be utilized to mount the support channels 66 on the semicircular tube section 62 in suitably spaced relation to each other in the manner depicted in FIG. 3 of the drawing.

In a similar fashion the second semicircular tube section 64 is also provided with a pair of support channels, a portion of one of which can be seen at 68 in FIG. 3 of the drawing. Although not depicted in the drawing in the interest of maintaining clarity of illustration therein, it is to be understood that the support channels 68 are suitably provided on the underside of the second semicircular tube section 64 in the same manner as the support channels 66 are mounted on the underside of the first semicircular tube section 62. Here also, any conventional form of mounting means suitable for use for such a purpose may be utilized to mount the support channels 68 on the underside of the second semicircular tube section 64 in suitably spaced relation to each other in like fashion to that depicted in FIG. 3 of the drawing in the case of the support channels 66 with which the first semicircular tube section 22 is suitably provided.

Referring again in particular to FIG. 2 of the drawing, it is to be understood that although not depicted in the drawing in the interest of maintaining clarity of illustration therein, the tubes of the first semicircular tube section 62 and the tubes of the second semicircular tube section 64 are preferably provided on their upper surface with a multiplicity of studs. These studs (not shown) are preferably secured to the upper surface of the tubes of the first semicircular tube section 62 and of the tubes of the second semicircular tube section 64 by being welded to the slag-touched surface of these tubes. As such, these studs (not shown) are designed to function to allow some slag to freeze on the slag-touched surface of the tubes of the first semicircular tube section 62 and of the tubes of the second semicircular tube section 64 so as to thereby minimize heat transfer, corrosion and erosion of the slag-touched surface of these tubes.

With further reference thereto, the first semicircular tube section 62 and the second semicircular tube section 64, as best understood with reference to FIGS. 2 and 3 of the drawing, are designed to be mated together such that the tap hole 60 to which reference has been had hereinbefore is thereby created at the center thereof. More specifically, this mating of the first semicircular tube section 62 and of the second semicircular tube section 64 is designed to be accomplished, as best understood with reference to FIG. 3 of the drawing, by positioning the support channels 66 associated with the first semicircular tube section 62 and the support channels 68 associated with the second semicircular tube section 64 in overlapping relation to each other. Moreover, in order to prevent any movement therebetween while the first semicircular tube section 62 and the second semicircular tube section 64 are positioned in mated relation one to another, the one embodiment of the slag tap system 20, which is depicted in FIGS. 2 and 3 of the drawing, preferably also incorporates fastening means, generally designated by the reference numeral 70 in FIG. 3. Any conventional form of fastening means suitable for use for such a purpose may be utilized to fasten the first semicircular tube section 62 and the second semicircular tube section 64 in mated relation to each other such as the bolts shown at 70 in FIG. 3.

Continuing with the description thereof, the one embodiment of slag tap system 20, which is depicted in FIGS. 2 and 3 of the drawing, further includes water inlet means and water outlet means. More specifically, the first semicircular tube section 62 and the second semicircular tube section 64 are each provided with water inlet means and water outlet means. Since the nature of the construction of the water inlet means and of the water outlet means with which the first semicircular tube section 62 is suitably provided is substantially the same as the nature of the construction of the water inlet means and the water outlet means with which the second semicircular tube section 64 is suitably provided, reference will be had for purposes of a detailed description of the nature of the construction of the water inlet means and the water outlet means for both the first semicircular tube section 62 and the second semicircular tube section 64 to simply the water inlet means, denoted generally by the reference numeral 72 in FIG. 3, and the water outlet means, denoted generally by the reference numeral 74 in FIG. 3, of the first semicircular tube section 62, as the first semicircular tube section 62 is illustrated in FIG. 3 of the drawing.

With reference, therefore, to FIG. 3 of the drawing, the water inlet means 72 is designed to be operative to permit water to flow therethrough into the first semicircular tube section 62. After completing its passage through the first semicircular tube section 62 this water then flows out of the first semicircular tube section 62 through the water outlet means 74. It should be noted here that the water inlet means 72 is purposely located on the outer periphery of the tubes of the first semicircular tube section 62 while the water outlet means 74 is purposely located somewhere near the middle of the tubes of the first semicircular tube section 62. The primary reason for so locating the water inlet means 72 and the water outlet means 74 is to allow the drip edge area, denoted generally by the reference numeral 76 in FIG. 3 of the drawing, to be free from unnecessary water-cooled surface which can cause local slag freezing and subsequent tap pluggage. The water, which is made to flow through the first semicircular tube section 62, may be provided from any suitable source thereof, not shown in the drawing in the interest of maintaining clarity of illustration therein, to which the water inlet means 72 is suitably connected for this purpose, and may be made to return to this suitable source (not shown) thereof by means of the water outlet means 74, which is suitably connected thereto for this purpose, after the water has been made to flow through the first semicircular tube section 62. Note is once again taken here of the fact that although not depicted in the drawing in the interest of maintaining clarity of illustration therein, the second semicircular tube section 64 in like fashion to the first semicircular tube section 62 is also provided with water inlet means and water outlet means embodying the same construction and mode of operation as the water inlet means 72 and the water outlet means 74, which have been described hereinbefore, of the first semicircular tube section 62.

Thus, by way of a brief summary of the embodiment of slag tap system 20, which is illustrated in particular in FIGS. 2 and 3 of the drawing, the slag tap system 20 allows the slag to be maintained in a high heat flux zone until the separation thereof from the drip edge area 76. The slag tap system 20 thus keeps the slag fluid and does not permit the slag to impinge on the slag neck waterwalls 22c thereby preventing slag solidification and subsequent tapping problems. The tap hole 60 is created at the center of the first semicircular tube section 62 and the second semicircular tube section 64, which are fabricated as two half-sections for ease of installation and maintenance, and so as to be easily removable. To this end, by virtue of the fact that the first semicircular tube section 62 and the second semicircular tube section 64 are fabricated as two half-sections, it is thereby possible for the first semicircular tube section 62 and the second semicircular tube section 64 to be each inserted through the slag neck portion 22c of the reaction vessel 12 in order to accomplish the installation thereof within the reaction vessel 12 in the field. Likewise, it is thereby also possible for the first semicircular tube section 62 and the second semicircular tube section 64 to be each withdrawn through the slag neck portion 22c of the reaction vessel 12 when the removal thereof from the interior of the reaction vessel 12 for maintenance purposes or any other purpose is desired. Moreover, when the first semicircular tube section 62 and the second semicircular tube section 64 are removed, the slag neck area 22c can be used as an access area or manway to the interior of the reaction vessel 12.

Continuing, water enters each of the first semicircular tube section 62 and second semicircular tube section 64 on the outer periphery thereof and is withdrawn somewhere near the middle thereof. This allows the drip edge area 76 of both the first semicircular tube section 62 and the second semicircular tube section 64 to be free from unnecessary water-cooled surface, which can cause local slag freezing and subsequent tap pluggage. Both the first semicircular tube section 62 and the second semicircular tube section 64 are supported on the floor 22b of the reaction vessel 12. Moreover, the first semicircular tube section 62 and the second semicircular tube section 64 are mated together by the support channel 66 with which the first semicircular tube section 62 is suitably provided and the support channels 68 with which the second semicircular tube section 64 is suitably provided. When so mated together, the first semicircular tube section 62 and the second semicircular tube section 64 are bolted together by means of the fastening means 70 so as to prevent movement therebetween. To remove the first semicircular tube section 62 and the second semicircular tube section 64, they are simply unbolted and made to separate, thereby allowing the first semicircular tube section 62 and the second semicircular tube section 64 to slide along the floor 22b. Finally, studs (not shown) are welded to the slag-touched surface of the tubes of the first semicircular tube section 62 and the second semicircular tube section 64 to allow some slag to freeze on the surface of these tubes to minimize heat transfer, corrosion and erosion at the tube surface. Preferably, the drip edge area 76 is formed of stainless steel that has been welded around the entire inner circumference of the tap hole 60 so as to thereby provide a clean surface on which the slag separation can occur.

A description will next be set forth herein of another embodiment of slag tap system with which in accordance with the present invention the pressurized gasifier system 10 that is depicted in FIG. 1 of the drawing may be suitably provided. To distinguish this embodiment of slag tap system from the embodiment of slag tap system which has previously been described herein this embodiment will hence forth for ease of reference be denoted by the reference numeral 20'. Moreover, for purposes of the description of the slag tap system 20', reference will be had in particular to FIGS. 4, 5, and 6 of the drawing.

Figure 5:
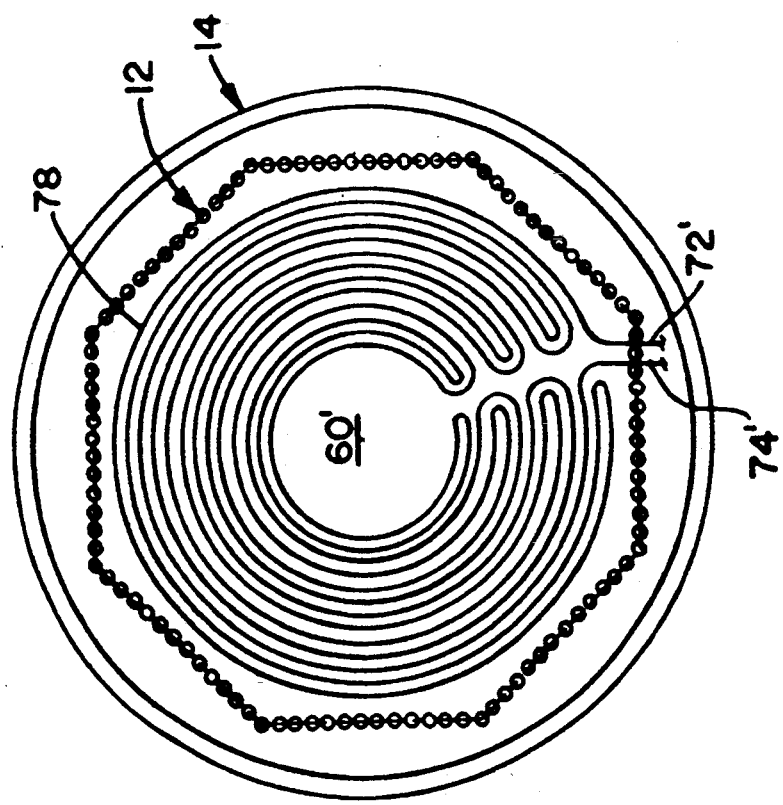
FIG. 5 is a top plan view of a portion of the embodiment of slag tap system illustrated in FIG. 4 depicting the slag tap system constructed in accordance with the present invention as being of unitary construction.

Continuing with the description thereof, the slag tap system 20' is designed to be positioned within the interior of the reaction vessel 12 at essentially the same location as that described hereinbefore for the slag tap system 20. The principal differences between the slag tap system 20' and the slag tap system 20 are the following. First of all, as depicted in FIG. 5 of the drawing the slag tap portion, denoted therein by the reference numeral 78, of the slag tap system 20' is preferably of unitary construction. As such, the slag tap portion 78 is designed to be mounted in supported relation within the reaction vessel 12 at the time of manufacture of the reaction vessel 12. In this regard, any conventional form of mounting means suitable for use for this purpose may be utilized for purposes of mounting the slag tap portion 78 in mounted relation within the interior of the reaction vessel 12. For instance, support channels similar to the support channels 66 and 68 to which reference has been had in connection with the description of the slag tap system 20 might be utilized for this purpose.

With further regard to the slag tap system 20', in a fashion similar to the slag tap system 20 the slag tap portion 78 is provided at the center thereof with a tap hole, denoted in the drawing for ease of reference by the reference numeral 60'. Although preferably of unitary construction, as depicted in FIG. 6 of the drawing the slag tap portion 78 of the slag tap system 20' may also, if so desired, be of nonunitary construction.

A second principal difference between the slag tap system 20' and the slag tap system 20 resides in the relative positioning therewithin of the water inlet means and the water outlet means. To this end, as has been described hereinbefore with respect to the slag tap system 20 the water inlet means 72 thereof are purposely located at the outer periphery of the first semicircular tube section 62 and the second semicircular tube section 64. The water outlet means 74 of the first semicircular tube section 62 and the second semicircular tube section 64, on the other hand, are located purposely somewhere near the middle thereof. However, in the case of the slag tap system 20' the water inlet means, denoted in FIG. 5 for ease of reference by the reference 72', as well as the water outlet means, denoted in FIG. 5 for ease of reference by the reference numeral 74', are both located at the outer periphery of the slag tap portion 78. By being so located the water inlet means 72' and the water outlet means 74' are nevertheless still operative, as are the water inlet means 72 and the water outlet means 74, to allow the drip edge area, denoted in the drawing for ease of reference by the reference numeral 76', of the slag tap portion 78 to be free from unnecessary water-cooled surface which can cause local slag freezing and subsequent tap pluggage.

Figure 4:
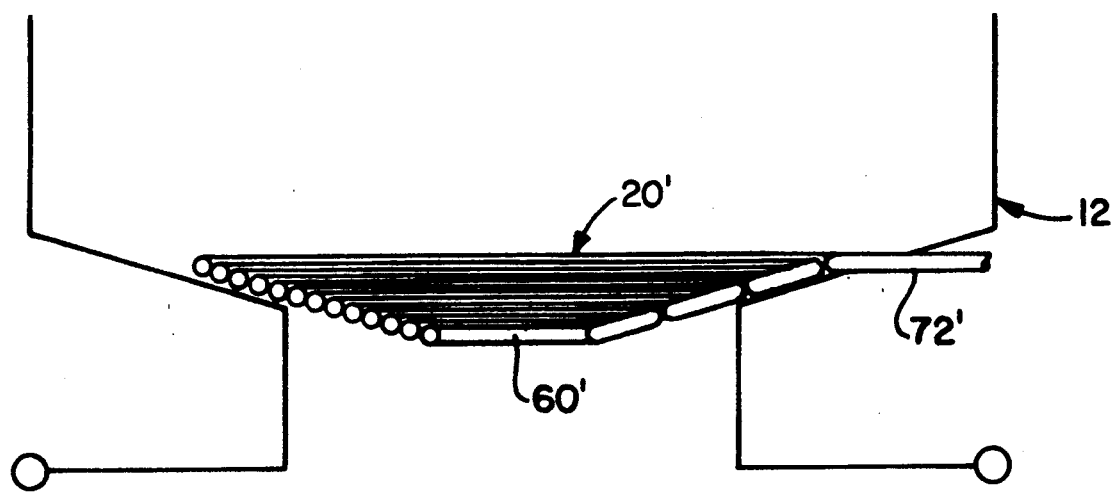
FIG. 4 is a side elevational view on an enlarged scale of the slag tap system portion of the reaction vessel of the gasifier system in FIG. 1 depicting another embodiment of slag tap system constructed in accordance with the present invention.

A third principal difference, which is best understood with reference to FIG. 4 of the drawing, between the slag tap system 20' and the slag tap system 20 resides in the manner in which the tubes of the slag tap portion 78 are positioned relative to each other as contrasted to the manner in which the tubes of both the first semicircular tube section 62 and the second semicircular tube section 64 are positioned relative to each other. To this end, as best seen with reference to FIG. 2 of the drawing the tubes of both the first semicircular tube section 62 and the second semicircular tube section 64 are arranged such as to lie essentially in the same horizontal plane. The tubes of the slag tap portion 78, on the other hand, are arranged in a step-like fashion. Namely, starting at the tap hole 60' the tubes of the slag tap portion 78 are inclined upwardly therefrom at approximately a 15° angle. The principal reason for so arranging the tubes of the slag tap portion 78 is to facilitate the removal of steam therefrom in the event that steam should form from the water, which is made to flow through the tubes of the slag tap portion 78 in like fashion to the manner in which the water, as has been described hereinbefore, is made to flow through the tubes of the first semicircular tube section 62 and the second semicircular tube section 64. Thus, it is to be understood that if such conversion of water to steam is perceived to be a potential problem in any particular application in which a slag tap system constructed in accordance with its present invention is to be employed then the tubes, be they the tubes of the slag tap portion 78 or the tubes of the first semicircular tube section 62 and the second semicircular tube section 64, should preferably be arranged in the fashion of the tubes of the slag tap portion 78, i.e., be inclined relative to each other at approximately a 15° angle.

Figure 6:
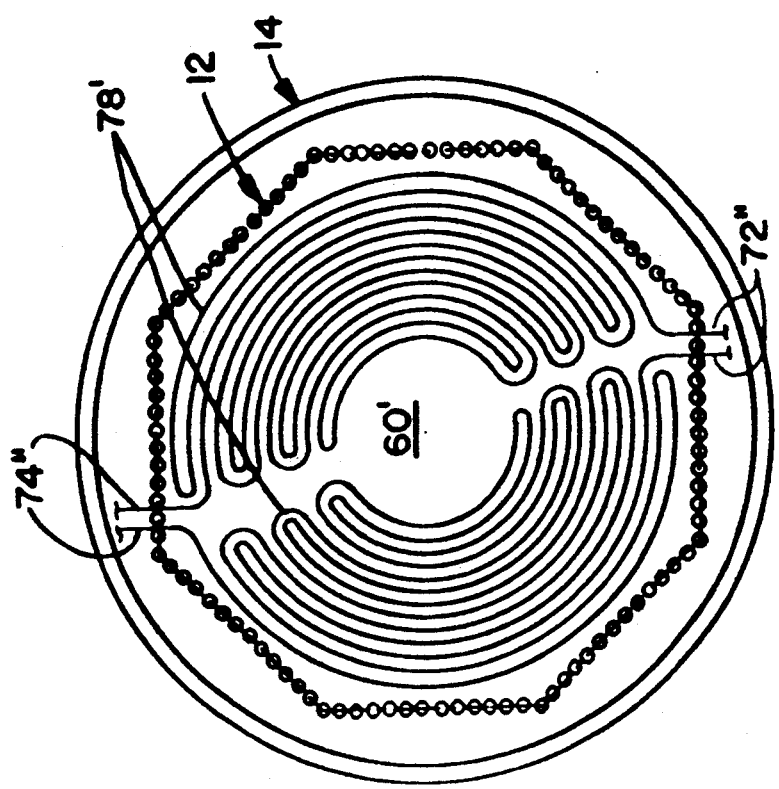
FIG. 6 is a top plan view of a portion of the embodiment of slag tap system illustrated in FIG. 4 depicting the slag tap system constructed in accordance with the present invention as being of nonunitary construction.

For purposes of completing the description herein of the slag tap system 20, as depicted particularly in FIGS. 2 and 3 of the drawing, and of the slag tap system 20', as depicted particularly in FIGS. 4, 5, and 6 of the drawing, it is to be understood that each of these systems further encompasses a slag tank, denoted generally by the reference numeral 80. Namely, as best seen with reference to FIG. 1 of the drawing it is to be understood that in each of these systems, i.e., in the slag tap system 20 and in the slag tap system 20', a slag tank 80 is designed to be suitably positioned below the tap hole thereof, i.e., the tap hole 60 in the case of the slag tap system 20 and the tap hole 60' in the case of the slag tap system 20'. As such, the molten slag after passing through the tap hole of the respective slag tap system drops into the slag tank 80. In the slag tank 80, which is preferably water filled, the molten slag is quenched, and as a consequence of such quenching is transformed into an inert, glassy, granular material. The slag tank 80, as best seen at 82 in FIG. 1, is suitably provided with a discharge port through which the slag that has been transformed into an inert, glassy, granular material is designed to be discharged from the slag tank 80.

Thus, in accordance with the present invention there has been provided a new and improved slag tap system for a gasifier. Plus, there has been provided in accord with the present invention such a new and improved slag tap system for a gasifier wherein the slag tap system is of self-supporting construction. Besides, in accordance with the present invention there has been provided such a new and improved slag tap system for a gasifier wherein the slag tap system permits the slag tap diameter to be designed for slag flow considerations such as slag viscosity and velocity. As well, there has been provided in accord with the present invention such a new and improved slag tap system for a gasifier wherein the slag tap system is in the form of sections, such that the sections can be unfastened one from another and be pushed along the floor of the gasifier vessel in order to thereby provide access to the interior of the gasifier vessel using the neck of the slag tap as a manway. Moreover, in accordance with the present invention there has been provided such a new and improved slag tap system for a gasifier wherein studded tubing is employed over the slag touched surfaces so as to thereby allow the slag to solidify to form a heat transfer barrier as well as a corrosion and erosion resistant surface to protect the parent steel of the slag tap. Also, there has been provided in accord with the present invention such a new and improved slag tap system for a gasifier wherein the slag tap system embodies a stainless steel drip edge thereby allowing for good slag separation. Further, in accordance with the present invention there has been provided such a new and improved slag tap system for a gasifier wherein the water inlet and outlet piping thereof is withdrawn from the tap hole, i.e., away from the drip edge area, thereby eliminating any excess tube surface near the drip edge on which slag can collect. In addition, there has been provided in accord with the present invention such a new and improved slag tap system for a gasifier wherein the slag tap sections of the slag tap system are capable of being shop fabricated and of being later installed in the field with a minimum amount of field installation. Penultimately, in accordance with the present invention there has been provided such a new and improved slag tap system for a gasifier which is advantageously characterized in that it is suitable for employment in newly constructed gasifiers as well as being equally suitable for utilization in gasifier retrofit applications. Finally, there has been provided in accord with the present invention such a new and improved slag tap system for a gasifier which is advantageously characterized in that it is relatively inexpensive to provide, yet despite being relatively simple in construction is reliable in operation.

While several embodiments of my invention have been shown, it will be appreciated that modifications thereof, some of which have been alluded to hereinabove, may still be readily made thereto by those skilled in the art. I, therefore, intend by the appended claims to cover the modifications alluded to herein as well as all the other modifications which fall within the true spirit and scope of my invention.

What is claimed is:

1. In a pressurized gasifier system including a reaction vessel and a pressure vessel positioned in surrounding relation to the reaction vessel, the reaction vessel having a plurality of walls terminating in a floor having a slag neck centrally located therewithin, the reaction vessel embodying within the plurality of walls thereof a first stage wherein fuel is burned producing slag and generating a temperature within the first stage of approximately 3000° F. and a second stage wherein the temperature is above 1700° F. and fuel is gasified to produce a product gas, the improvement comprising a slag tap system operative for effecting the discharge from the pressurized gasifier system of the slag produced within the pressurized gasifier system, said slag tap system comprising:

a. a first semicircular tube section having a first end and a second end;

b. a second semicircular tube section having a first end and a second end, said second semicircular tube section being positioned in mating relation with said first semicircular tube section so that a portion of said first semicircular tube section and a portion of said second semicircular tube section collectively define the circumference of a slag tap hole located at the center of said first semicircular tube section and said second semicircular tube section, said portion of said first semicircular tube section and said portion of said second semicircular tube section each further being operative as a drip edge to prevent slag from freezing around the circumference of the slag tap hole so as to thereby prevent subsequent pluggage of the slag tap hole;

c. support means including first support channel means affixed to said first semicircular tube section and second support channel means affixed to said second semicircular tube section, said first support channel means being operative to support said first semicircular tube section in spaced relation to the floor of the reaction vessel and said second support channel means being operative to support said second semicircular tube section in spaced relation to the floor of the reaction vessel such that the slag tap hole located at the center of said first semicircular tube section and said second semicircular tube section is coaxially aligned with the slag neck centrally located in the floor of the reaction vessel;

d. water inlet means operatively connected in fluid flow relation to said first end of said first semicircular tube section for introducing water into said first semicircular tube section, said water inlet means further being operatively connected in fluid flow relation to said first end of said second semicircular tube section for introducing water into said second semicircular tube section;

e. water outlet means operatively connected in fluid flow relation to said second end of said first semicircular tube section so as to be operative as an outlet from said first semicircular tube section for the water after the passage thereof through said first semicircular tube section, said water outlet means further being operatively connected in fluid flow relation to said second end of said second semicircular tube section so as to be operative as an outlet from said second semicircular tube section for the water after the passage thereof through said second semicircular tube section;

f. a slag tank mounted in supported relation within the pressure vessel below and in spaced relation to the slag tap hole, said slag tank being operative to receive the slag after the discharge thereof through the slag tap hole located at the center of said first semicircular tube section and said second semicircular tube section, said slag tank being filled with water such that the slag discharged thereinto is quenched and as a consequence of such quenching is transformed into an inert, glassy, granular material; and g. discharge means operatively connected to said slag tank and operative for discharging from said slag tank the slag that has been transformed into an inert, glassy, granular material.

2. In a pressurized gasifier system, the slag tap system as set forth in claim 1 wherein said first semicircular tube section and said second semicircular tube section both lie within the same plane.

3. In a pressurized gasifier system, the slag tap system as set forth in claim 1 wherein said water inlet means and said water outlet means are located in spaced relation one to another.

4. In a pressurized gasifier system, the slag tap system as set forth in claim 1 wherein said water inlet means and said water outlet means are located in adjoining relation one to another.

* * * * *